(12) United States Patent
Alvi et al.

(10) Patent No.: US 12,370,924 B2
(45) Date of Patent: Jul. 29, 2025

(54) MULTILEVEL DIRECT CURRENT POWER SOURCE POWERING MULTILEVEL INVERTER

(71) Applicant: GM Global Technology Operations LLC, Detroit, MI (US)

(72) Inventors: Muhammad Hussain Alvi, Troy, MI (US); Chandra S. Namuduri, Troy, MI (US); Suresh Gopalakrishnan, Troy, MI (US); Junghoon Kim, Ann Arbor, MI (US); Yilun Luo, Ann Arbor, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 173 days.

(21) Appl. No.: 18/347,874

(22) Filed: Jul. 6, 2023

(65) Prior Publication Data

US 2025/0010761 A1 Jan. 9, 2025

(51) Int. Cl.
*B60L 50/51* (2019.01)
*B60L 58/20* (2019.01)
(Continued)

(52) U.S. Cl.
CPC ............... *B60L 58/20* (2019.02); *B60L 50/51* (2019.02); *H02M 1/081* (2013.01); *H02M 1/088* (2013.01);
(Continued)

(58) Field of Classification Search
CPC ...... B60L 58/20; B60L 50/51; B60L 2210/42; H02M 1/081; H02M 1/088; H02M 7/4835;
(Continued)

(56) References Cited

U.S. PATENT DOCUMENTS

2017/0144553 A1* 5/2017 Steele .................... H02M 3/04
2019/0288535 A1* 9/2019 Jaensch .................... H02P 5/74

FOREIGN PATENT DOCUMENTS

DE 102014226159 A1 6/2016

OTHER PUBLICATIONS

Choi et al. "Diagnosis and tolerant strategy of an open-switch fault for T-type three-level inverter systems." IEEE Transactions on Industry Applications 50.1 (2013): 495-508.
(Continued)

*Primary Examiner* — Elim Ortiz
(74) *Attorney, Agent, or Firm* — CANTOR COLBURN LLP (57) ABSTRACT

A multi-level inverter control system includes a power storage system having a high voltage terminal, a low voltage terminal, and an intermediate voltage terminal. The intermediate voltage terminal is at a voltage between the high voltage terminal and the low voltage terminal. A multi-level inverter includes a plurality of switches, a high voltage input connected to the high voltage terminal, a low voltage input connected to the low voltage terminal, and an intermediate voltage input connected to the intermediate voltage terminal. A controller is controllably coupled to the multi-level inverter. The controller includes at least a processor and a memory. The memory stores instructions configured to cause the controller to operate the multi-level inverter in a three-level inverter mode, a full power two-level inverter mode, a first partial power two-level inverter mode and a second partial power two-level inverter mode.

20 Claims, 4 Drawing Sheets

(51) Int. Cl.
*H02M 1/08* (2006.01)
*H02M 1/088* (2006.01)
*H02M 7/483* (2007.01)

(52) U.S. Cl.
CPC ....... *H02M 7/4835* (2021.05); *B60L 2210/42* (2013.01)

(58) Field of Classification Search
CPC .. H02M 1/0048; H02M 1/0095; H02M 1/325; H02M 7/487; H02M 7/53871
USPC ........ 307/10.1, 106, 125; 318/504; 363/131; 315/186, 209 R, 287, 291
See application file for complete search history.

(56) References Cited

OTHER PUBLICATIONS

German Application No. 10 2023 127 375.2 filed Oct. 8, 2023; German Office Action dated Aug. 20, 2024; 4 pages.

\* cited by examiner

MULTILEVEL DIRECT CURRENT POWER SOURCE POWERING MULTILEVEL INVERTER

INTRODUCTION

The subject disclosure relates to a multilevel inverter configured to draw power from direct current (DC) power sources having multilevel outputs, and to a control system for the same.

Electric vehicles and hybrid electric vehicles include power storage systems that store electric power and output DC power. Drive motors, and other mechanical features of the vehicle, however, require alternating current to operate. To facilitate converting DC power to alternating current (AC) power, vehicles include one or more inverters. Inverters use actively controlled switches (E.G., transistors) to convert the DC power into a sinusoidal, or approximately sinusoidal, AC power output.

Two-level (and higher) voltage source inverters include limitations related to the efficiency driven by high switching losses and current ripples, reliability degradation due to dv/dt (change in voltage over time) changes, di/dt (change in current over time) changes, and electromagnetic interferences, and power density degradation due to capacitance changes. Existing systems attempt to address some of these issues by utilizing multi-level inverters.

SUMMARY

In one exemplary embodiment a multi-level inverter control system including a power storage system having a high voltage terminal, a low voltage terminal, and an intermediate voltage terminal, wherein the intermediate voltage terminal is at a voltage between the high voltage terminal and the low voltage terminal, a multi-level inverter including a plurality of switches, a high voltage input connected to the high voltage terminal, a low voltage input connected to the low voltage terminal, and an intermediate voltage input connected to the intermediate voltage terminal, and a controller controllably coupled to the multi-level inverter, the controller including at least a processor and a memory, the memory storing instructions configured to cause the controller to operate the multi-level inverter in a three-level inverter mode, a full power two-level inverter mode, a first partial power two-level inverter mode and a second partial power two-level inverter mode.

In addition to one or more of the features described herein, the power storage system is a battery including a plurality of cells and the cells are divided into a first group of cells and a second group of cells, wherein a voltage differential between the low voltage terminal and the intermediate voltage terminal is a voltage of the first group of cells and a voltage differential between the intermediate terminal and the high voltage terminal is the voltage of the second group of cells.

In addition to one or more of the features described herein, the voltage differential of the first group of cells and the voltage differential of the second group of cells is identical.

In addition to one or more of the features described herein, the memory further includes instructions for identifying a cell fault in a cell in one of the first group of cells and the second group of cells and instructions for responding to the identified cell fault by operating the multilevel inverter in the first partial power two-level inverter mode when the identified cell fault is in the first group of cells and operating the multilevel inverter in the second partial power two-level inverter mode when the cell fault is in the second group of cells.

In addition to one or more of the features described herein, the multi-level inverter is a T-type inverter topology, having a first capacitor connecting the high voltage input to the intermediate voltage input, a second capacitor connecting the intermediate voltage input to the low voltage input, a first switch connecting the high voltage terminal to an AC output, a pair of second switches connecting the intermediate voltage terminal to the AC output, and a third switch connecting the low voltage input to the AC output.

In addition to one or more of the features described herein, the first partial power two-level inverter mode comprises holding the first switch open, thereby electrically removing the first switch and the first capacitor from the multi-level T-type inverter topology and operating the pair of second switches and the third switch as a two-level inverter.

In addition to one or more of the features described herein, the second partial power two-level inverter mode comprises holding the third switch open, thereby electrically removing the third switch and the second capacitor from the multi-level T-type inverter topology and operating the pair of second switches and the first switch as a two-level inverter.

In addition to one or more of the features described herein, the controller is further configured to operate the multi-level inverter in the first partial power mode while discharging a first set of cells within the power storage system until a charge threshold is reached, and configured to alternate operations between the first partial power two-level inverter mode and the second partial power two-level inverter mode thereby maintaining a balance between the first set of cells and a second set of cells.

In yet another exemplary embodiment a method of operating an inverter within a vehicle power system includes operating the inverter in a multi-level operations mode while the vehicle power system is in a nominal mode, operating the inverter in one of a full power two-level inverter mode, a first partial power two-level inverter mode and a second partial power two-level inverter mode while the power system is in a non-nominal mode, and wherein the inverter is a T-type inverter topology, having a first capacitor connecting a high voltage input to an intermediate voltage input, a second capacitor connecting the intermediate voltage input to a low voltage input, a first switch connecting the high voltage terminal to an AC output, a pair of second switches connecting the intermediate voltage terminal to the AC output, and a third switch connecting the low voltage input to the AC output.

In addition to one or more of the features described herein, the inverter is operated in the full power two-level inverter mode while the non-nominal mode is an identified fault in the pair of second switches of the inverter.

In addition to one or more of the features described herein, operating in the full power two-level inverter mode comprises maintaining at least one switch of the pair of second switches in an open state for a full duration of operating in the full power two-level inverter mode.

In addition to one or more of the features described herein, the inverter is operated in the first partial power two-level inverter mode while the non-nominal mode is a fault in at least one of a first set of power cells of a connected DC battery, a fault in the first capacitor, and a fault in the first switch, and wherein the inverter is operated in the second partial power two-level inverter mode while the non-nominal mode is a fault in at least one of a second set of power cells of the connected DC battery, a fault in the second capacitor, and a fault in the third switch.

In addition to one or more of the features described herein, operating in the first partial power two-level inverter mode comprises maintaining the first switch in an open state for a duration of the first partial power two-level inverter mode, and wherein operating in the second partial power two-level inverter mode comprises maintaining the third switch in an open state for a duration of the second partial power two-level inverter mode.

In addition to one or more of the features described herein, the power system comprises a DC battery having a plurality of cells split into a first set of cells and a second set of cells, and wherein the first set of cells is connected between the high voltage input and the intermediate voltage input and the second set of cells is connected between the intermediate voltage input and the low voltage input.

In addition to one or more of the features described herein, the first partial power two-level inverter mode is entered in response to a detected fault in the first set of cells and the second partial power two-level inverter mode is entered in response to a detected fault in the second set of cells.

In addition to one or more of the features described herein, the first partial power two level mode is entered into in response to at least one condition negatively impacting inverter thermal properties, inverter efficiency, and inverter lifespan.

One or more of the features described herein, further includes balancing a battery system connected to the inverter, the battery system including a plurality of cells and the cells are divided into a first group and a second group, wherein a voltage differential between the low voltage terminal and the intermediate voltage terminal is a voltage of the first group and a voltage differential between the intermediate terminal and the high voltage terminal is the voltage of the second group by placing the inverter in the first partial power two-level inverter mode and discharging the first group until a charge threshold is reached, placing the inverter in the second partial power two-level inverter mode and discharging the second group until the charge threshold is reached, and alternating operations between the first partial power mode and the second partial power mode thereby maintaining a balance between the first set of cells and a second set of cells.

In yet another exemplary embodiment a vehicle includes a power storage system having a high voltage terminal, a low voltage terminal, and an intermediate voltage terminal, wherein the intermediate voltage terminal is at a voltage between the high voltage terminal and the low voltage terminal, at least two electric motors configured to convert AC power to mechanical rotation, a multi-level inverter connected to the power storage system and configured to output AC power, the multi-level inverter including a plurality of switches, a high voltage input connected to the high voltage terminal, a low voltage input connected to the low voltage terminal, and an intermediate voltage input connected to the intermediate voltage terminal, and a controller controllably coupled to the multi-level inverter, the controller including at least a processor and a memory, the memory storing instructions configured to cause the controller to operate the inverter in a three-level inverter mode, a full power two-level inverter mode, a first partial power two-level inverter mode and a second partial power two-level inverter mode.

In addition to one or more of the features described herein, the multi-level inverter is a T-type inverter topology, having a first capacitor connecting the high voltage input to the intermediate voltage input, a second capacitor connecting the intermediate voltage input to the low voltage input, a first switch connecting the high voltage terminal to an AC output, a pair of second switches connecting the intermediate voltage terminal to the AC output, and a third switch connecting the low voltage input to the AC output.

In addition to one or more of the features described herein, the first partial power two-level inverter mode comprises holding the first switch open, thereby electrically removing the first switch and the first capacitor from the multi-level T-type inverter topology and operating the pair of second switches and the third switch as a two-level inverter, and wherein the second partial power two-level inverter mode comprises holding the third switch open, thereby electrically removing the third switch and the second capacitor from the multi-level T-type inverter topology and operating the pair of second switches and the first switch as a two-level inverter.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

The following description is merely exemplary in nature and is not intended to limit the present disclosure, its application or uses. It should be understood that throughout the drawings, corresponding reference numerals indicate like or corresponding parts and features. As used herein, the term module refers to processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

In accordance with some exemplary embodiments, the multilevel inverter systems described herein generally utilize an intermediate voltage node at a voltage level lower than the high voltage terminal, and higher than at the low voltage (zero voltage) terminal. The intermediate voltage node is directly connected to a intermediate voltage tap within a corresponding power source. In some examples, the intermediate voltage tap is at a split in a split battery pack, where the battery pack includes multiple cells and the voltage at the split is a combined voltage of a subset of cells in the battery. Providing the direct connection to an intermediate voltage tap allows for the multilevel inverter to be operated more efficiently and allows for the inverter to continue operating as a two-level inverter in additional modes of operation during one or more fault conditions.

Figure 1:
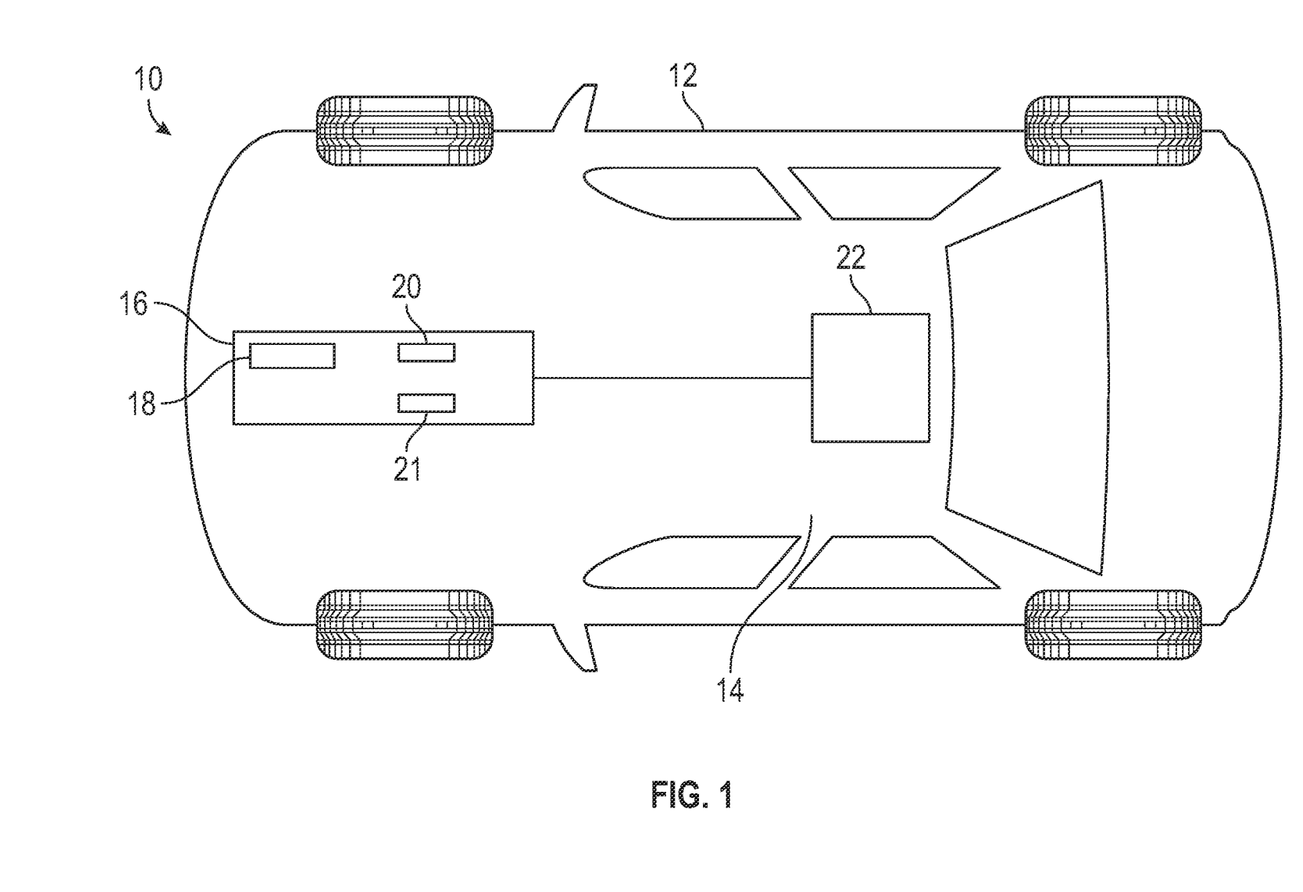
FIG. 1 is an exemplary vehicle including a Direct Current (DC) power storage system and a pair of Alternating Current (AC) driven drive motors.

FIG. 1 shows an embodiment of a motor vehicle 10, which includes a vehicle body 12 defining, at least in part, an occupant compartment 14. The vehicle body 12 also supports various vehicle subsystems including a propulsion system 16, a battery system 22 and other subsystems to support functions of the propulsion system 16 and other vehicle components, such as a braking subsystem, a suspension system, a steering subsystem, a fuel injection subsystem, an exhaust subsystem and others.

The vehicle 10 may be a combustion engine vehicle, an electrically powered vehicle (EV) or a hybrid vehicle. In an embodiment, the vehicle 10 is a hybrid vehicle that includes a combustion engine system 18 and at least one electric motor assembly. For example, the propulsion system 16 includes a first electric motor 20 and a second electric motor 21. The motors 20 and 21 may be configured to drive wheels on opposing sides of the vehicle 10. Additionally, any number of motors positioned at various locations about the vehicle 10 may be used.

The battery system 22 may be electrically connected to the motors 20 and 21 and/or other components, such as vehicle electronics. The battery system 22 may be configured as a rechargeable energy storage system (RESS), and includes multiple cells partitioned into portions, as well as multiple voltage outputs (taps).

Figure 2:
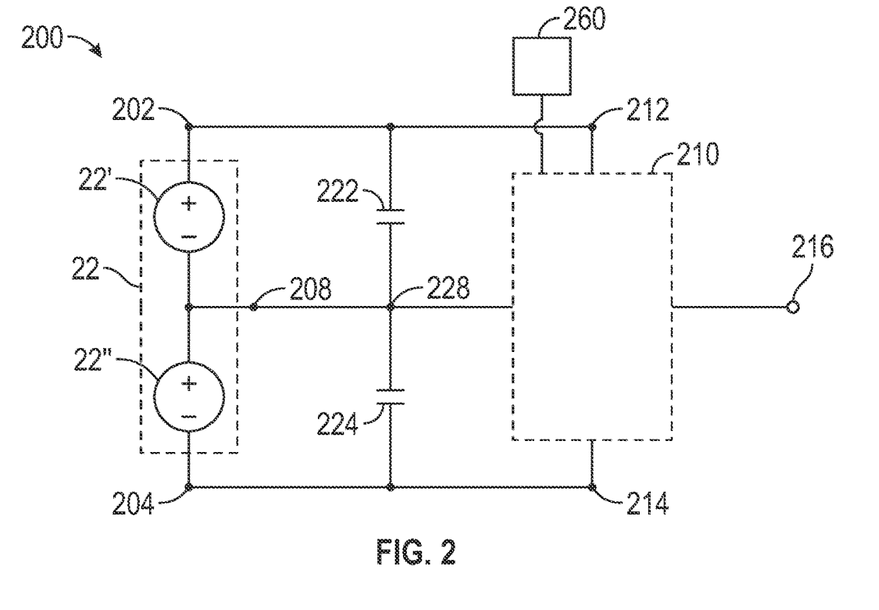
FIG. 2 is a schematic multilevel inverter for converting DC power from the power storage system to AC power for the drive motors.

With continued reference to FIG. 1, FIG. 2 illustrates an exemplary inverter system 200 including a multilevel inverter 210 for converting DC power from the battery system 22 to an AC power output 216 to one or more phase of the motor(s) 20, 21. The AC power output 216 provides drive power to the motor(s) 20, 21 to which the AC power output 216 is connected. The battery system 22 includes a high voltage output terminal 202 and a low voltage output terminal 204, each of which are connected to corresponding input terminals 212, 214 of the multilevel inverter 210 topology. The connection between the high voltage output terminal 202 and the high voltage input 212, as well as a switch 344 (illustrated in FIGS. 3-6, alternately referred to as a first switch)) connecting the high voltage input 212 to the AC output 216 is referred to as the high voltage leg 404. Similarly, the connection between the low voltage output terminal 204 and the low voltage input 214 and the switch 346 (illustrated in FIGS. 3-6, alternately referred to as a third switch) connecting the low voltage input to the AC output 216 is referred to as the low voltage leg 406. The direct connection between the intermediate input 228 and the intermediate terminal 208, as well as the two switches 340, 342 (illustrated in FIGS. 3-6, alternately referred to as a pair of second switches) connecting the input 228 to the AC output 216 are referred to as the intermediate leg 402.

As used herein, "high voltage" refers to the voltage potential of the battery system 22 when fully charged, "low voltage" refers to a zero, or approximately zero, voltage potential, and "intermediate voltage" refers to a voltage potential between the high and low voltage. The switching within the inverter 210 is actively controlled by an active inverter controller 260 to convert the DC power into an AC power out at the AC power output 216. The inverter controller 260 can be a dedicated inverter controller, a module within a power systems controller, a module within a general controller, a distributed control architecture, or any similar control system within the vehicle 10.

Connected across the terminals 212, 214 is a pair of series arranged capacitors 222, 224. The capacitors 222, 224 are connected at an intermediate voltage node 228. The intermediate voltage node 228 is directly connected to a corresponding intermediate voltage output terminal 208 of the battery system 22. The intermediate voltage output node 208 can be provided at a midpoint between sets of cells 22', 22", modules, or packs within the battery system 22. In alternative examples, the intermediate voltage output 208 can be a node connecting two series arranged battery systems 22 or any electrically similar power storage systems. The two sets of cells 22', 22" can have identical voltage potentials, the first set of cells 22' can be higher than the second set of cells 22", or the second set of cells 22" can have a higher voltage potential than the first set of cells 22'. As used herein, the voltage potential of a set of cells 22', 22" or other similar component refers to the voltage differential output by the set of cells 22', 22" while the set of cells 22', 22" is at full capacity.

The direct connection between the intermediate voltage node 228 and the intermediate voltage terminal 208 provides three stable voltage levels to supply the inverter 210, with the intermediate voltage level not being dependent on the charge state of the capacitors 222, 224. The three stable voltage levels, in turn allow for the capacitors 222, 224 to solely operate as high frequency ripple current filters. Being limited to the ripple filtering function allows for a substantial reduction in physical size, volume, capacitance, and weight of the capacitors 222, 224.

Figure 3:
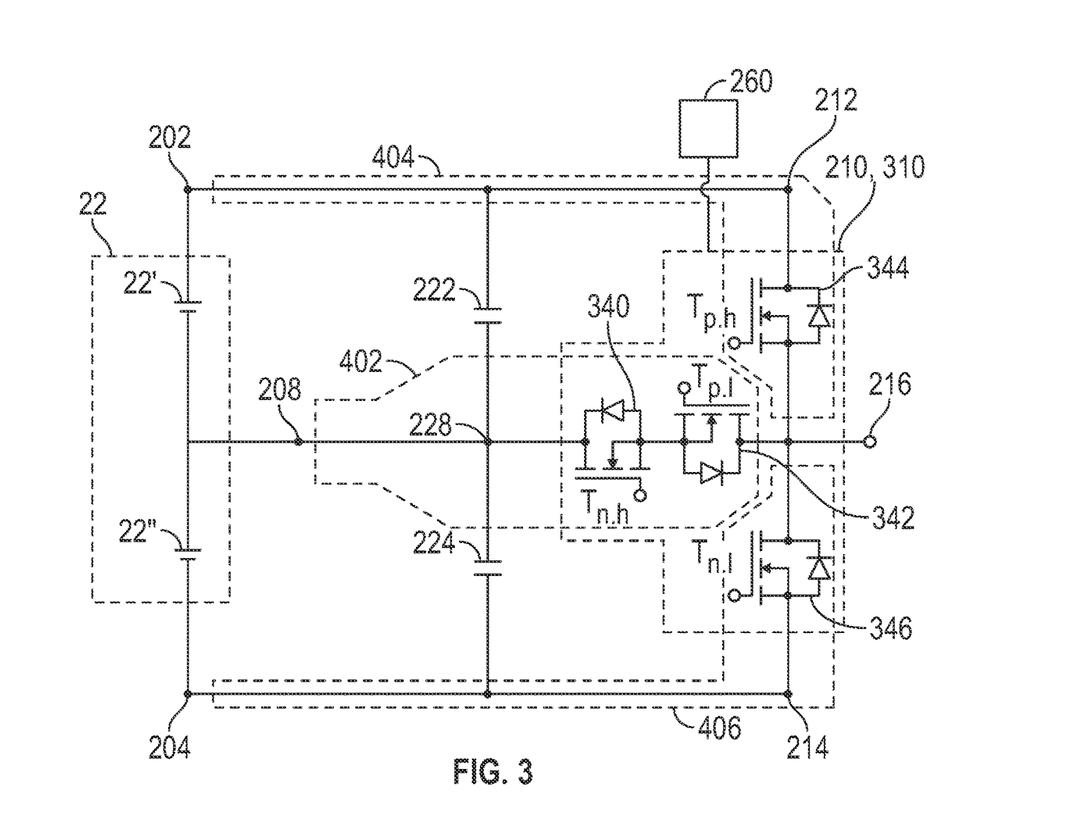
FIG. 3 is an example single phase leg of a T-type multilevel inverter topology configured to interface with a direct midpoint terminal.

With continued reference to FIG. 2, FIG. 3 illustrates a single phase leg of an exemplary multi-level inverter topology 310 that can be utilized as the inverter 210 of the system 200 illustrated in FIG. 2, with the topology 310 being a T-type inverter. In a three phase example, the illustrated phase leg is replicated once for each phase. It is appreciated that operations of the single phase shown herein are simultaneously replicated on each phase during operation of the full three phase assembly. The illustrated phase leg of the topology 310 is provided in the context of the inverter system 200 of FIG. 2 and is actively controlled to produce AC power at an AC output 216 by a controller within the vehicle according to known control processes.

Referring specifically to the T-type inverter phase leg 310 of FIG. 3, the phase leg 310 includes a first MOSFET switch 340 including a drain connected to the intermediate voltage node 228 and a source connected to the source of a second MOSFET switch 342. The drain of the second MOSFET switch 342 is connected to the power output 216. In addition, the phase leg 310 includes a third MOSFET switch 344 with a drain connected to the high voltage output terminal 202, and a source connected to the AC power output 216. A fourth MOSFET switch 346 includes a drain connected to the power output 216 and a source connected to the low voltage output terminal 204.

Each of the switches 340, 342, 344, 346 is controlled via a control signal originating from a controller 260 and provided to the corresponding gate. The controller 260 sets the control signals and switching rates according to known inverter control methodologies to achieve desired AC power output characteristics at the power output 216.

In addition to the increased voltage stability at the intermediate node 228 arising due to the direct connection to an intermediate voltage output of the battery system 22, multitap connections to the battery system 22 allow for the incorporation of additional modes of operating the T-type inverter 310 responsive to various possible operating conditions (E.G., short circuits, over currents, charging requirements, capacitor temperatures, etc.), thereby improving operation of the vehicle power system.

Figure 4:
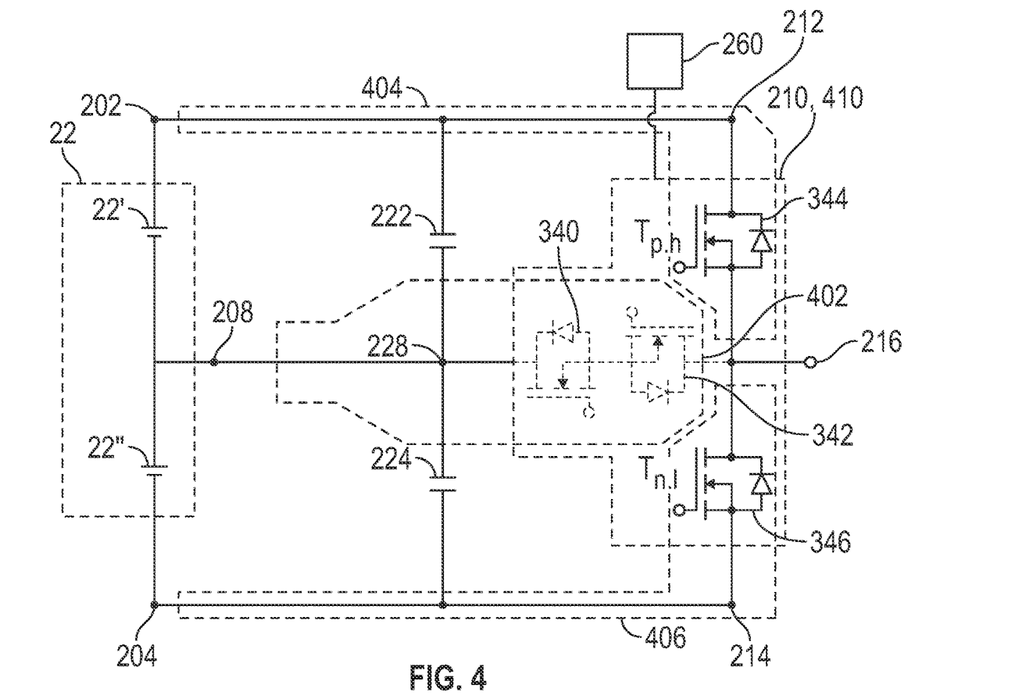
FIG. 4 illustrates the single phase leg of a T-type multi-level inverter topology of FIG. 3 being operated in a two-level mode without a midpoint.
Figure 5:
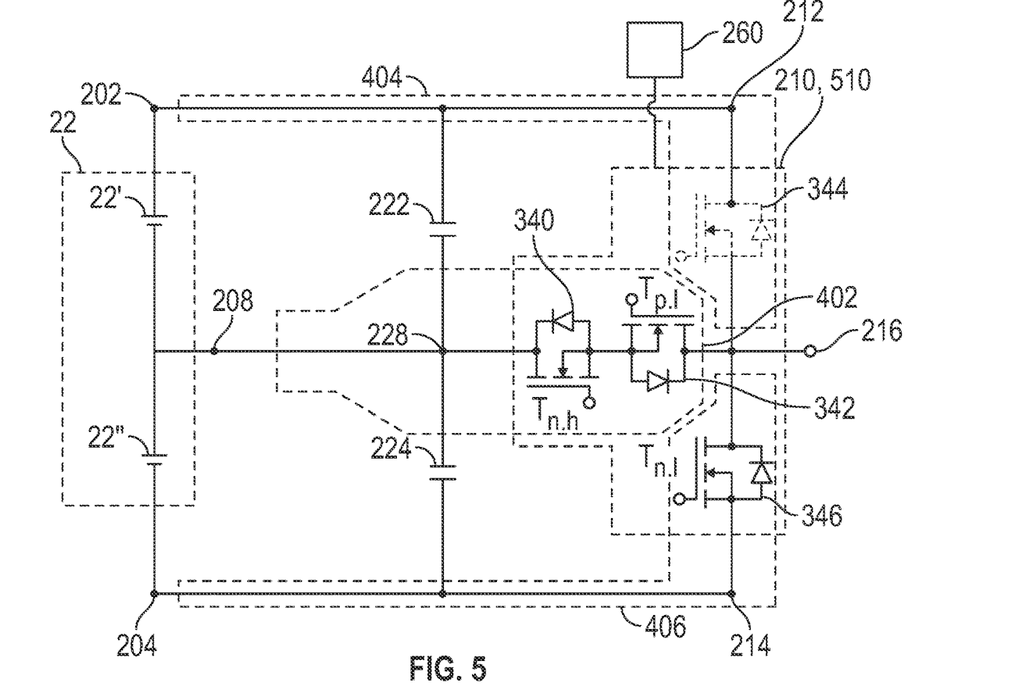
FIG. 5 illustrates the single phase leg of a T-Type multi-level inverter topology of FIG. 3 being operated in a first two-level partial power mode of operations.
Figure 6:
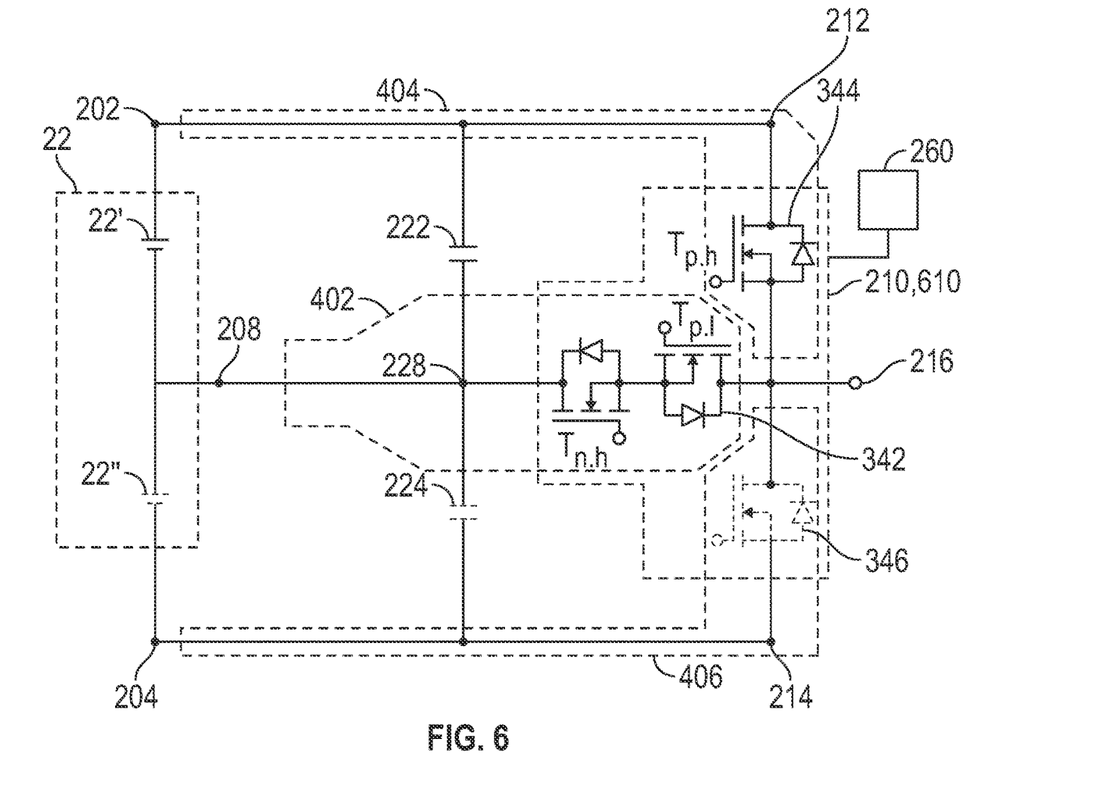
FIG. 6 illustrates a full T-Type multilevel inverter topology using the phase-legs of FIG. 3 being operated in a second two-level partial power mode of operations.

With continued reference to FIG. 3, FIGS. 4-6 illustrate distinct additional modes of operation, with each of FIGS. 4, 5 and 6 illustrating a differing mode.

In some circumstances a fault can occur at one or more points within the battery system 22, and the inverter 210. Depending on the location and type of fault, the required response can range from ceasing operations immediately to indefinite continued operation in a two-level mode and monitoring. When such a fault occurs, the controller 260 electrically removes a portion of the inverter 210 from the topology, and operates the remaining portions as a two-level inverter at either full or partial capacity, depending on the location and type of the fault or the purpose for entering the two-level mode. The portion is electrically removed by holding open one or more switches 340, 342, 344, 346 within the portion being removed, thereby prevent current from flowing through the portion.

With reference to FIGS. 1-3, FIG. 4 illustrates an operation of the T-type inverter phase leg 410 as a two-level inverter without a midpoint by holding one or both of the pair of switches 344, 346 on the intermediate leg 402 open, thereby electrically removing the intermediate leg 402 from the circuit. This operation may be selected when a fault occurs on the intermediate leg 402. When this type of fault occurs, the controller 260 switches the inverter 210 into a two-level inverter without a midpoint. The remaining two switches 344, 346 are operated in conjunction with the capacitors 222, 224 by the controller 260 as conventional two-level inverter providing an AC output 216.

The mode of operations illustrated in FIG. 4 allows for continued operation of the inverter 210 at a full power level, but as a two-level inverter until the fault is rectified or can be otherwise addressed. In yet further examples, the two-level inverter without a midpoint mode of operations shown in FIG. 4 can be entered into in response to a problem with leg 402. In some cases, the mode can be entered if traditional two level inverter operation is desirable to achieve an efficiency, speed or torque operation point.

In alternative examples, when there is a fault in either a high leg 404, or the low leg 406, or where a fault condition exists within one or more sets of cells 22', 22" of the battery system 22, the controller 260 can place the inverter 210 into a first partial power two-level inverter mode illustrated in FIG. 5 or into a second partial power two-level inverter mode illustrated in FIG. 6. The illustrated partial power two-level inverter mode phase legs 510, 610 operate in a fundamentally similar manner due to the similar resultant circuit construction.

When a fault in either the high leg 404 or the low leg 406 arises, the controller 260 electrically removes the portion of the inverter 210 where the fault has occurred and shifts operation to the corresponding partial power two-leg inverter mode phase legs 510, 610. When the fault occurs within the first set of battery cells 22', the first capacitor 222, or the third switch 344, the controller 260 maintains the third switch 344 open, thereby preventing current from passing through the high voltage input leg 202 and operating in the partial two-level inverter mode phase leg 510 illustrated in FIG. 5. In contrast, when the fault occurs within the second set of battery cells 22', the second capacitor 224, or the fourth switch 346, the controller 260 maintains the fourth switch 346 open, thereby preventing current from passing through the low voltage input leg 406. An electrical disconnection of the third switch 344 or the fourth switch 346 guarantees zero current in one direction. However, under positive bias the switch 344, 346 may still conduct. Proper gate control of active switches prevents such a positive bias from occurring and can be achieved according to known conventional methods.

In the specific case of a fault within a cell 22', 22" in one of the sets of cells 22', 22" in the battery system 22, the partial power two-level inverter mode phase legs 510, 610 electrically remove the correspond sets of battery cells 22', 22" thereby allowing for continued operation of the vehicle 10 without risking propagation of the fault in the battery cell 22 to other cells 22', 22" or potential further damage to the vehicle. The severity and cause of the battery cell fault impacts how long the inverter 210 may continue to operate in the partial power mode of FIGS. 5 and 6. Relatedly, if a fault occurs in one of the capacitors 222, 224, holding the corresponding switch open removes the faulty capacitor from the circuit and prevents the fault from causing further damage to the inverter.

While described above with regards to detected fault conditions, it is appreciated that sensing technology exists to identify other conditions that may benefit from temporarily switching to a two-level mode of operations. By way of example, the controller 260 can include a sensor input corresponding to the temperatures of the capacitors 222, 224, or otherwise determine the temperature of portions of the inverter 210. When such information is available, the controller 260 can switch to a two-level mode of operations 510, 610 that electrically removes an overheating capacitor 222, 224 from the inverter 210 until the temperature of the capacitor 222, 224 has cooled with the mode of FIG. 5 being used when capacitor 222 is overheating, and the mode of FIG. 6 being used when the capacitor 224 is overheating. The length of time for cooling can be either predetermined or based on measured or derived temperature threshold. A similar process can be applied to any thermal detection within the inverter 210 and is not limited to the specific example of the capacitors 224, 222.

In yet another example, the controller 260 can determine that there is an unbalance in the battery system 22 while the vehicle 10 is operating. When the unbalance is due to the battery cell 22" having a higher charge, the controller 260 first places the vehicle 10 in the first partial power two-level inverter mode phase leg 510 of FIG. 5 and discharges the first set of cells 22' within the battery system 22. Then, once a sufficient charge threshold and balance between the top side and bottom side has been reached, unity balance is reached in the state of charge for the set of cells 22', 22". When the unbalance is due to the battery cell 22' having a higher charge, the controller 26 places the vehicle 10 in the mode illustrated in FIG. 6, and balance is achieved in the same manner.

In yet another example, the controller 260 can determine a saturation condition in one of the switches 340, 342, 344, 346 and allow for continued operation of the inverter 210 in one of the two-level inverter mode phase legs 410, 510, 610 in the event that one of the switches 340, 342, 344, 346 unintentionally becomes desaturated. The mode selected depends on the specific switch that becomes desaturated, with the mode of FIG. 4 corresponding to desaturation of switches 340 and 342, the mode of FIG. 5 corresponding to desaturation of switch 344, and the mode of FIG. 6 corresponding to desaturation of switch 346. As with the previous examples, when a desaturation fault occurs, the controller 260 detects the desaturation and places the inverter 210 in the corresponding mode of operations that electrically removes the switch experiencing the saturation fault and the inverter 210 can continue to operate.

In certain cases the operation in two level partial power modes (FIGS. 5 and 6) can be entered to achieve higher efficiency in low speed operation of the motor(s) 20, 21. When the motor is operating at low speeds half the battery 22 with less DC bus voltage can still be used to power the motor(s) 20, 21. Applying lower DC voltage improve the inverter and motor efficiency. In alternative control embodiments, two level partial power mode can be entered to avoid over heating of inverter's switches due to aging or faulty behavior.

In alternate examples, the multilevel inverter 210 can include up to N intermediate voltage connections for an N-level invertor, where N is a total available voltage outputs from the battery system 22. In such examples, an expanded form of the above described methodology can be employed by the controller 260 to switch an operational mode of an N-level inverter into an N−1 level inverter, responsive to similar faults or conditions.

The terms "a" and "an" do not denote a limitation of quantity, but rather denote the presence of at least one of the referenced item. The term "or" means "and/or" unless clearly indicated otherwise by context. Reference throughout the specification to "an aspect", means that a particular element (e.g., feature, structure, step, or characteristic) described in connection with the aspect is included in at least one aspect described herein, and may or may not be present in other aspects. In addition, it is to be understood that the described elements may be combined in any suitable manner in the various aspects.

When an element such as a layer, film, region, or substrate is referred to as being "on" another element, it can be directly on the other element or intervening elements may also be present. In contrast, when an element is referred to as being "directly on" another element, there are no intervening elements present.

Unless specified to the contrary herein, all test standards are the most recent standard in effect as of the filing date of this application, or, if priority is claimed, the filing date of the earliest priority application in which the test standard appears.

Unless defined otherwise, technical and scientific terms used herein have the same meaning as is commonly understood by one of skill in the art to which this disclosure belongs.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A multi-level inverter control system comprising:
a power storage system having a high voltage terminal, a low voltage terminal, and an intermediate voltage terminal, wherein the intermediate voltage terminal is at a voltage between the high voltage terminal and the low voltage terminal;
a multi-level inverter including a plurality of switches, a high voltage input connected to the high voltage terminal, a low voltage input connected to the low voltage terminal, and an intermediate voltage input connected to the intermediate voltage terminal; and
a controller controllably coupled to the multi-level inverter, the controller including at least a processor and a memory, the memory storing instructions configured to cause the controller to operate the multi-level inverter in a three-level inverter mode, a full power two-level inverter mode, a first partial power two-level inverter mode and a second partial power two-level inverter mode; and
wherein the controller is configured to balance a battery system connected to the multi-level inverter, the battery system including a plurality of cells and the cells are divided into a first group and a second group, wherein a voltage differential between the low voltage terminal and the intermediate voltage terminal is a voltage of the first group and a voltage differential between the intermediate terminal and the high voltage terminal is the voltage of the second group by
placing the multi-level inverter in the first partial power two-level inverter mode and discharging the first group until a charge threshold is reached;
placing the multi-level inverter in the second partial power two-level inverter mode and discharging the second group until the charge threshold is reached; and
alternating operations between the first partial power mode and the second partial power mode thereby maintaining a balance between the first set of cells and a second set of cells.

2. The multi-level inverter control system of claim 1, wherein the power storage system is a battery including a plurality of cells and the cells are divided into a first group of cells and a second group of cells, wherein a voltage differential between the low voltage terminal and the intermediate voltage terminal is a voltage of the first group of cells and a voltage differential between the intermediate terminal and the high voltage terminal is the voltage of the second group of cells.

3. The multi-level inverter control system of claim 2, wherein the voltage differential of the first group of cells and the voltage differential of the second group of cells is identical.

4. The multi-level inverter control system of claim 3, wherein the memory further includes instructions for identifying a cell fault in a cell in one of the first group of cells and the second group of cells and instructions for responding to the identified cell fault by operating the multilevel inverter in the first partial power two-level inverter mode when the identified cell fault is in the first group of cells and operating the multilevel inverter in the second partial power two-level inverter mode when the cell fault is in the second group of cells.

5. The multi-level inverter control system of claim 1 wherein the multi-level inverter is a T-type inverter topology, having a first capacitor connecting the high voltage input to the intermediate voltage input, a second capacitor connecting the intermediate voltage input to the low voltage input, a first switch connecting the high voltage terminal to an AC output, a pair of second switches connecting the intermediate voltage terminal to the AC output, and a third switch connecting the low voltage input to the AC output.

6. The multi-level inverter control system of claim 5, wherein the first partial power two-level inverter mode comprises holding the first switch open, thereby electrically removing the first switch and the first capacitor from the multi-level T-type inverter topology and operating the pair of second switches and the third switch as a two-level inverter.

7. The multi-level inverter control system of claim 5, wherein the second partial power two-level inverter mode comprises holding the third switch open, thereby electrically removing the third switch and the second capacitor from the multi-level T-type inverter topology and operating the pair of second switches and the first switch as a two-level inverter.

8. The multi-level inverter control system of claim 1, wherein the controller is further configured to operate the multi-level inverter in the first partial power mode while discharging a first set of cells within the power storage system until a charge threshold is reached, and configured to alternate operations between the first partial power two-level inverter mode and the second partial power two-level inverter mode thereby maintaining a balance between the first set of cells and a second set of cells.

9. A method of operating an inverter within a vehicle power system comprising:
operating the inverter in a multi-level operations mode while the vehicle power system is in a nominal mode;
operating the inverter in one of a full power two-level inverter mode, a first partial power two-level inverter mode and a second partial power two-level inverter mode while the power system is in a non-nominal mode; and
wherein the inverter is a T-type inverter topology, having a first capacitor connecting a high voltage input to an intermediate voltage input, a second capacitor connecting the intermediate voltage input to a low voltage input, a first switch connecting the high voltage terminal to an AC output, a pair of second switches connecting the intermediate voltage terminal to the AC output, and a third switch connecting the low voltage input to the AC output; and
balancing a battery system connected to the inverter, the battery system including a plurality of cells and the cells are divided into a first group and a second group, wherein a voltage differential between the low voltage terminal and the intermediate voltage terminal is a voltage of the first group and a voltage differential between the intermediate terminal and the high voltage terminal is the voltage of the second group by
placing the inverter in the first partial power two-level inverter mode and discharging the first group until a charge threshold is reached;
placing the inverter in the second partial power two-level inverter mode and discharging the second group until the charge threshold is reached; and
alternating operations between the first partial power mode and the second partial power mode thereby maintaining a balance between the first set of cells and a second set of cells.

10. The method of claim 9, wherein the inverter is operated in the full power two-level inverter mode while the non-nominal mode is an identified fault in the pair of second switches of the inverter.

11. The method of claim 10, wherein operating in the full power two-level inverter mode comprises maintaining at least one switch of the pair of second switches in an open state for a full duration of operating in the full power two-level inverter mode.

12. The method of claim 9, wherein the inverter is operated in the first partial power two-level inverter mode while the non-nominal mode is a fault in at least one of a first set of power cells of a connected DC battery, a fault in the first capacitor, and a fault in the first switch, and wherein the inverter is operated in the second partial power two-level inverter mode while the non-nominal mode is a fault in at least one of a second set of power cells of the connected DC battery, a fault in the second capacitor, and a fault in the third switch.

13. The method of claim 12, wherein operating in the first partial power two-level inverter mode comprises maintaining the first switch in an open state for a duration of the first partial power two-level inverter mode, and wherein operating in the second partial power two-level inverter mode comprises maintaining the third switch in an open state for a duration of the second partial power two-level inverter mode.

14. The method of claim 9, wherein the power system comprises a DC battery having a plurality of cells split into a first set of cells and a second set of cells, and wherein the first set of cells is connected between the high voltage input and the intermediate voltage input and the second set of cells is connected between the intermediate voltage input and the low voltage input.

15. The method of claim 14, wherein the first partial power two-level inverter mode is entered in response to a detected fault in the first set of cells and the second partial power two-level inverter mode is entered in response to a detected fault in the second set of cells.

16. The method of claim 14, wherein the first partial power two level mode is entered into in response to at least one condition negatively impacting inverter thermal properties, inverter efficiency, and inverter lifespan.

17. A vehicle comprising:
a power storage system having a high voltage terminal, a low voltage terminal, and an intermediate voltage terminal, wherein the intermediate voltage terminal is at a voltage between the high voltage terminal and the low voltage terminal;
at least two electric motors configured to convert AC power to mechanical rotation;
a multi-level inverter connected to the power storage system and configured to output AC power, the multi-level inverter including a plurality of switches, a high voltage input connected to the high voltage terminal, a low voltage input connected to the low voltage terminal, and an intermediate voltage input connected to the intermediate voltage terminal; and
a controller controllably coupled to the multi-level inverter, the controller including at least a processor and a memory, the memory storing instructions configured to cause the controller to operate the inverter in a three-level inverter mode, a full power two-level inverter mode, a first partial power two-level inverter mode and a second partial power two-level inverter mode; and
wherein the controller is configured to balance a battery system connected to the inverter, the battery system including a plurality of cells and the cells are divided into a first group and a second group, wherein a voltage differential between the low voltage terminal and the intermediate voltage terminal is a voltage of the first group and a voltage differential between the intermediate terminal and the high voltage terminal is the voltage of the second group by placing the inverter in the first partial power two-level inverter mode and discharging the first group until a charge threshold is reached;

placing the inverter in the second partial power two-level inverter mode and discharging the second group until the charge threshold is reached; and alternating operations between the first partial power mode and the second partial power mode thereby maintaining a balance between the first set of cells and a second set of cells.

18. The vehicle of claim 17, wherein the multi-level inverter is a T-type inverter topology, having a first capacitor connecting the high voltage input to the intermediate voltage input, a second capacitor connecting the intermediate voltage input to the low voltage input, a first switch connecting the high voltage terminal to an AC output, a pair of second switches connecting the intermediate voltage terminal to the AC output, and a third switch connecting the low voltage input to the AC output.

19. The vehicle of claim 17, wherein the first partial power two-level inverter mode comprises holding the first switch open, thereby electrically removing the first switch and the first capacitor from the multi-level T-type inverter topology and operating the pair of second switches and the third switch as a two-level inverter, and wherein the second partial power two-level inverter mode comprises holding the third switch open, thereby electrically removing the third switch and the second capacitor from the multi-level T-type inverter topology and operating the pair of second switches and the first switch as a two-level inverter.

20. The vehicle of claim 17 wherein the power storage system is a battery including a plurality of cells and the cells are divided into a first group of cells and a second group of cells, wherein a voltage differential between the low voltage terminal and the intermediate voltage terminal is a voltage of the first group of cells and a voltage differential between the intermediate terminal and the high voltage terminal is the voltage of the second group of cells.

\* \* \* \* \*